United States Patent [19]

Chenausky

[11] Patent Number: 4,751,717
[45] Date of Patent: Jun. 14, 1988

[54] RF TRANSFORMER AND DIAGNOSTIC TECHNIQUE THEREFOR

[76] Inventor: Peter Chenausky, 151 Deercliff Rd., Avon, Conn. 06001

[21] Appl. No.: 728,744

[22] Filed: Apr. 30, 1985

[51] Int. Cl.[4] .............................................. H01S 3/097
[52] U.S. Cl. ........................................ 372/82; 372/87; 372/38
[58] Field of Search ....................... 372/87, 86, 83, 82, 372/38

[56] References Cited

U.S. PATENT DOCUMENTS

| | | | |
|---|---|---|---|
| 4,363,126 | 12/1982 | Chenausky et al. | 372/82 |
| 4,365,337 | 12/1982 | Cirkel et al. | 372/87 |
| 4,373,202 | 2/1983 | Laakmann et al. | 372/83 |
| 4,423,510 | 12/1983 | Pack et al. | 372/87 |
| 4,493,087 | 12/1985 | Laakmann et al. | 372/87 |
| 4,521,889 | 6/1985 | Cirkel et al. | 372/87 |
| 4,631,732 | 12/1986 | Christensen | 372/82 |

*Primary Examiner*—Leon Scott, Jr.
*Attorney, Agent, or Firm*—Chilton, Alix & Van Kirk

[57] ABSTRACT

An RF transformer employs at least three elongated conductive elements in generally parallel spaced relationship. At least a first inductive element is connected between a pair of the conductive elements to provide a desired field distribution. A diagnostic technique for determining the frequency shift of the transformer employs a perturbing object which is selectively longitudinally positioned within the transformer. The transformer has particular utility as an RF excited gas laser.

15 Claims, 8 Drawing Sheets

FIG. 3
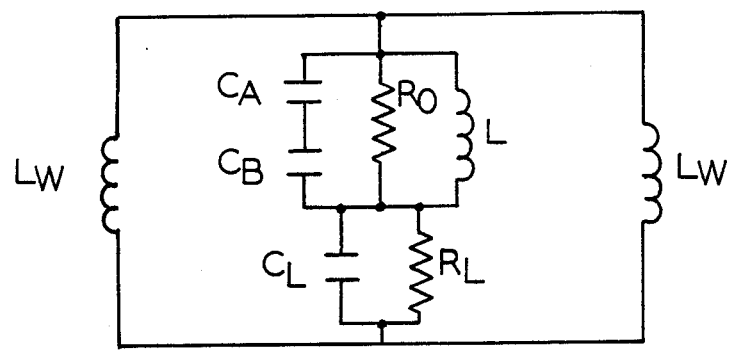
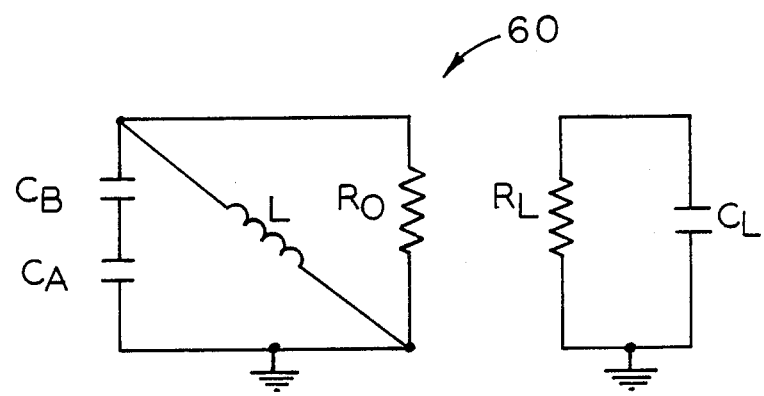
FIG. 4

RF TRANSFORMER AND DIAGNOSTIC TECHNIQUE THEREFOR

BACKGROUND OF THE INVENTION (1) Field of the Invention

This invention relates to RF transformers. More particularly, the present invention is directed to RF transformers particularly well-suited to be employed for exciting gas lasers with a transverse RF discharge and to a diagnostic technique therefore. Accordingly, the general objects of the present invention are to provide novel and improved apparatus and methods of such character.

(2) Description of the Prior Art

While not limited thereto in its utility, the present invention is particularly well-suited for use in association with RF excited gas lasers. U.S. Pat. Nos. 4,169,251, 4,352,188, 4,363,126, 4,429,398 and 4,443,877 generally disclose RF excited gas lasers which employ two opposing conducting surfaces between which a transverse gas discharge is created. U.S. Pat. No. 4,169,251 discloses a wave guide laser which is excited by means of a transverse discharge at sufficiently high RF frequencies to insure negligable interaction of discharge electrons with the discharge establishing electrodes. U.S. Pat. No. 4,352,188 discloses an RF pumped wave guide laser wherein a transverse RF excitation voltage at a frequency of at least thirty (30) MHz is applied between elongated electrodes on opposite sides of a laser discharge chamber. A plurality of shunt inductances are coupled between the opposing electrodes externally of the chamber at periodically spaced positions along the length of the chamber to provide a negative admittance which compensates for the variation of the phase angle of the transmission line reflection coefficient along the length of the laser discharge chamber. The variation in the magnitude of the voltage standing wave ratio (VSWR) along the laser chamber produced by the excitation voltage is thereby reduced.

U.S. Pat. No. 4,363,126, discloses an RF excited gas laser which employs a tuned circuit having a resonant frequency wherein the real part of the complex impedance of the discharge chamber is matched to the output impedance of a driving oscillator by placing an inductive element in parallel with the laser discharge chamber resistance and capacitance. The value of the inductance is selected so that the resonant frequency of the discharge chamber tuned circuit created by the addition of the inductive element has a predetermined relationship to the RF driving frequency of the laser. An input circuit compensates for the reactive part of the discharge chamber impedance.

A principal technical problem associated with RF excited gas lasers is the transmission line effects which result from increasing the electrical length of the laser or the excitation frequency of the laser, the electrical length of a laser being proportional to the excitation frequency and the physical length of the laser. Increasing the electrical length of the laser tends to adversely affect the discharge uniformity and consequently reduces the operating efficiency and the obtainable output power of the laser resulting in a laser with low output power per unit length. Another principal deficiency of conventional RF excited gas lasers is the inefficient power transfer between the RF driving source and the gas discharge.

BRIEF SUMMARY OF THE INVENTION

In accordance with the general objects of the present invention, a new and improved RF transformer particularly well-suited for use in a transverse RF excited gas laser overcomes many of the deficiencies of the prior art by providing improved longitudinal discharge uniformity and improved power transfer to the discharge region, i.e., the gas discharge in a RF gas laser. A diagnostic technique associated with the RF transformer provides information relative to the output impedance level of and longitudinal voltage variation along the RF transformer. This technique is useful in determining the relative voltage variation along a gas discharge chamber.

Briefly stated, the invention comprises an RF transformer which defines a narrow elongated cavity. In a preferred embodiment, four elongated electrically conductive elements are disposed in spaced relationship within the cavity. The first and fourth elements are grounded. A power supply which provides a voltage in the 25 MHz to 1,000 MHz range is applied between first and second of these conductive elements. An inductive connection between two of the conductive elements, for example the first and third elements, enables establishment of a higher output voltage which is measured between the third and fourth conductive elements. The output voltage has a magnitude which does not substantially vary along the longitudinal axis of the cavity and provides a pre-established impedance transformation to the region between the third and fourth conductive elements. In a preferred application, the region between the third and fourth elements comprises the tranverse gas discharge chamber of an RF excited gas laser, the region between the first and second and the second and third conductive elements is preferably substantially occupied by a low loss dielectric material.

The output impedance level in and voltage, i.e., the field strength variation along the transformer in the gap between the third and fourth conductive elements is measured by introducing a perturbing object in the transformer output gap. The perturbing object is interposed at various positions along the gap and the resulting frequency shift of the input VSWR level yields the desired absolute or relative field information.

BRIEF DESCRIPTION OF THE DRAWING

FIG. 3 is a circuit diagram of a simplified equivalent circuit for the transformer of FIG. 2;

FIG. 4 is a circuit diagram of an equivalent compound circuit for the transformer of FIG. 2;

DETAILED DESCRIPTION OF THE INVENTION

Figure 1:
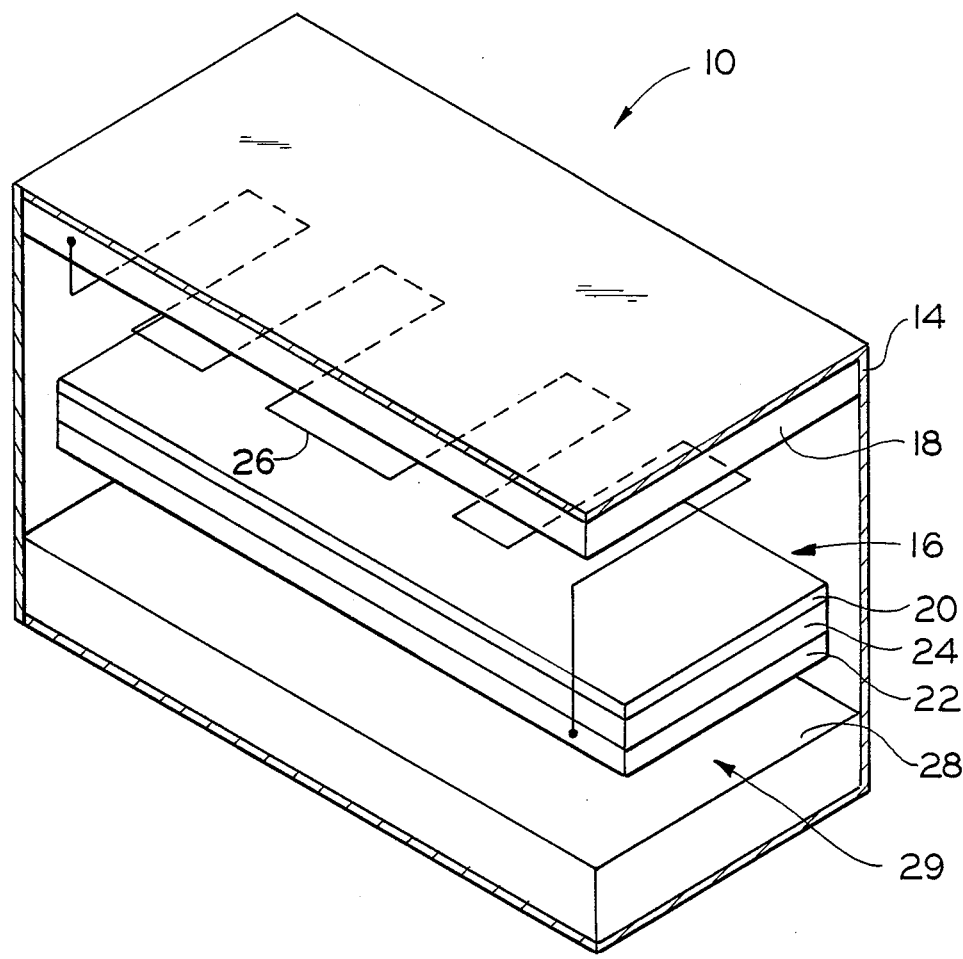
FIG. 1 is a schematic fragmentary perspective view illustrating an RF transformer in accordance with a first embodiment of the present invention.

With reference to the drawing wherein like numerals represent like parts throughout the several Figures, an RF transformer in accordance with the invention is generally designated by the numeral 10. RF transformer 10 is particularly well-suited for use in supplying an excitation voltage to a gas discharge in an RF excited gas laser. A preferred application of RF transformer 10 is in a wave guide laser. However, the invention may also be employed in RF excited gas lasers whose optical resonators support free space stable or unstable modes, as well as numerous other applications requiring an RF transformer.

With reference to FIG. 1, the basic geometrical characteristics and relationships of RF transformer 10 are illustrated. An elongated substantially rectangular housing 14 defines an elongated longitudinally extending cavity 16. Cavity 16 has a uniform substantially rectangular cross-section. An elongated grounded electrically conductive element 18 is mounted at the top of cavity 16 in a fixed relationship to the walls of housing 14. Conductive element 18 is in electrical contact with the interior wall of housing 14 and generally extends longitudinally substantially parallel to the central longitudinal axis of cavity 16. Conductive element 18 has a uniform thickness and a uniform width.

A second electrically conductive element 20 and a third electrically conductive element 22 of elongated form are supported in spaced relationship and typically are oriented substantially parallel to element 18. Conductive element 20 is disposed between elements 18 and 22. Conductive elements 20 and 22 are separated by an elongated separator strip 24 having a substantially uniform thickness. Strip 24 is comprised of a low loss dielectric material such as "Teflon" or an aluminum oxide ceramic material. A copper wire generally designated by the numeral 26 electrically connects element 18 to element 22. Wire 26 is configured to form a number of turns or inductive units to provide the transformer inductance. Wire 26, and in particular the formed inductive units, are both the region of cavity 16 which lies between elements 18 and 20. The illustrated turns or windings of wire 26 are, of course, a schematic representation.

An elongated ground plate 28 is also electrically connected to housing 14 and typically is mounted in fixed relationship against the bottom panel of housing 14. Plate 28 will usually be oriented parallelly with respect to element 22. The region between ground plate 28 and element 22 defines a discharge cavity region 29. When transformer 10 acts as a step-up transformer, elements 18 and 20 function as the input terminals for the transformer and element 22 and ground plate 28 function as the output terminals. Housing 14 may be of a rectangular, cylindrical or other form which is selected so that the housing will have a relatively low inductance relative to the transformer inductance. The foregoing transformer is preferably configured so that the discharge cavity 29 between element 22 and ground plate 28 is substantially free of any circuit magnetic fields. The transformer of FIG. 1 can be employed to develop a high voltage RF signal at, for example, 150 MHz.

The spacing between element 22 and plate 28 may be varied, by means not shown, to some other dimension by replacing element 22 and plate 28 with components of lesser or greater height. Since a change in the load capacitance will effect the operative frequency of the transformer, the length of inductor 26 will have to be changed to compensate for the change in capacitance. For a given frequency of operation, if the gap i.e., the width, of region 29 is increased, the length of inductor wire 26 will have to be either made longer, or, if only a small change is required, the wire from which inductor 26 is made may be kept the same length but made of smaller diameter material.

For a given frequency of operation the impedance transformation ratio may be altered by moving the location of element 20 in relation to that of elements 18 and 22. Since element 18 is a grounded element, one method of easily determining whether element 24 should be made thicker or thinner is to invert the elements 18, 20, 22, 24 and 26 as a single unit. This effectively moves element 20 closer to ground and will generate a higher transformer impedance ratio. Elements 20 and 22 must, however, have a constant spacing if a constant impedance ratio along the longitudinal dimension is to be maintained.

Figure 2:
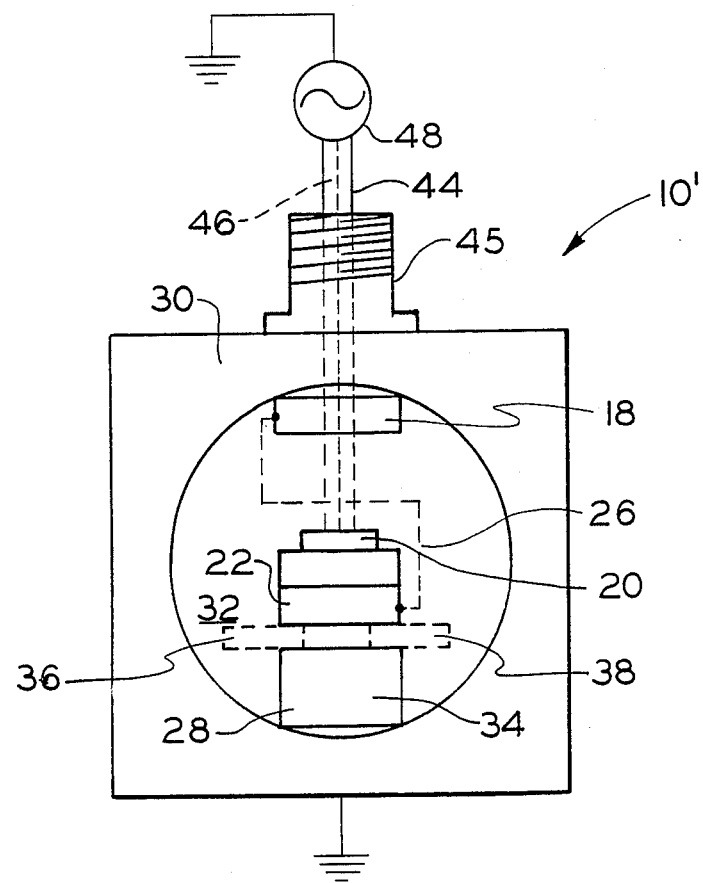
FIG. 2 is a cross-sectional side elevation view of a second embodiment of the RF transformer of the present invention.

With reference to FIG. 2, an alternate RF transformer embodiment adapted for incorporation into an RF excited laser is generally designated by the numeral 10'. A housing 30 is formed from a cube of aluminum, and in one reduction to practice, had a three-inch edge. A central bore 32, having a diameter of 2.250 inches in the example being discussed, extends longitudinally through opposing sides of the housing. Element 18 and plate 28 are, as in the FIG. 1 embodiment, grounded. An optical guided wave discharge chamber 34 is defined between element 22 and ground plate 28 and parallel dielectric spacers 36 and 38 (illustrated in dashed lines). Elements 22, 28, 36 and 38 are spaced to form an optical cavity having a uniform transverse dimension on the order of 0.090 square inches and a length perpendicular to the plane of the drawing of approximately 2.5 inches. The cavity may be further defined by conventional mirrors (not illustrated) for resonating laser radiation. An RF oscillator 48 supplies power via a coaxial cable 45 whose inner conductor 46 is electrically connected to conductive element 20. Inner conductor 46 is enclosed by a tubular insulator 44 that is extended to element 20 and is disposed in generally perpendicular relationship to element 20. Oscillator 48 and the coaxial cable 45 have a standard real output impedance of 50 ohms.

A simplified compound equivalent circuit for RF transformer 10' is illustrated in FIG. 3. Longitudinal transmission line effects may be disregarded since the transformer components are less than 0.03 wavelengths in length. The distributed capacitance between the grounded conductive element 18 and the intermediate ungrounded conductive element 20 is denoted by $C_A$. The capacitance between the ungrounded conductive element 20 and conductive element 22 is denoted by $C_B$ while the series inductance of the wire 26 connecting elements 18 and 22 is denoted by L. The equivalent shunt loss of inductor L is denoted by $R_0$. The inductance of the transformer housing enclosure is denoted by $L_W$. The capacitance into which the tranformer is to be loaded is denoted by $C_L$. The resistance into which the transformer is to be loaded is denoted by $R_L$.

If the transformer inductance L is large relative to the housing inductance $L_W$ in the principal frequency region for the transformer, the load capacitance $C_L$ and the load resistance $R_L$ are effectively in parallel with the transformer components. An equivalent compound circuit for the latter relationship is illustrated in FIG. 4. Therefore, although the components of transformer 10' are a ranged to be geometrically or mechanically in series, the compound electrical consequence is that the resonant divider circuit of transformer 10' is effectively in shunt with its reactive load. It should be appreciated that FIG. 4 is a conceptual model which provides a framework for illustrating the favorable characteristics of RF transformer 10' even though in fact the transformer inductance need not be in parallel with the $C_A$ and $C_B$ capacitance. Accordingly, some design freedom can be used to alter the longitudinal distribution of transformer voltage.

In one embodiment of RF transformer 10', the transformer inductor 26 was formed from a single piece of copper wire having a length of 12 inches and a diameter of 0.035 inches. The region between elements 18 and 20 was occupied by a layer of "Teflon" material having a thickness of 0.700 inches. Strip 24 was also comprised of a "Teflon" material having a thickness of 0.250 inches, and the uniform distance between conductive elements 22 and 28 was 0.093 inches. Elements 18, 22, 24 and 28 were all between 0.700 and 0.805 inches in width, with strip 20 being 0.420 inches wide by 0.125 inches thick by 1.8 inches in length where operation near 144 MHz was intended.

With reference to the left hand portion of FIG. 4, which comprises equivalent electrical circuit 60 comprising elements $C_A$, $C_B$ L and $R_o$, the generally large value of equivalent shunt loss $R_o$ of the transformer inductance L is stepped down to a lower value by the capacitive divider of $C_A$ and $C_B$ with the step down ratio being proportional to:

$$\frac{C_B^2}{(C_A + C_B)^2}$$

This relationship is derived from the more complete expression for the transformer input impedance whose real ($R_e$) and reactive ($I_m$) components are:

$$R_e = \frac{R_o w^2 L(C_A + C_B)[(w^2 L C_B - 1) - (w^2 L C_T - 1)]}{[w^2 L(C_A + C_B)]^2 + [R_o w(C_A + C_B)(w^2 L C_T - 1)]^2}$$

$$I_m = \frac{-(C_A + C_B)[wL(w^2 L) + wR_o^2(w^2 L C_B - 1)(w^2 L C_T - 1)]}{[w^2 L(C_A + C_B)]^2 + [R_o w(C_A + C_B)(w^2 L C_T - 1)]^2}$$

and subject to the condition that the angular frequency $w = 2\pi f$ and that:

$$C_T = \frac{C_A C_B}{C_A + C_B}$$

are related by $w^2 L C_T = 1$.

Figure 5:
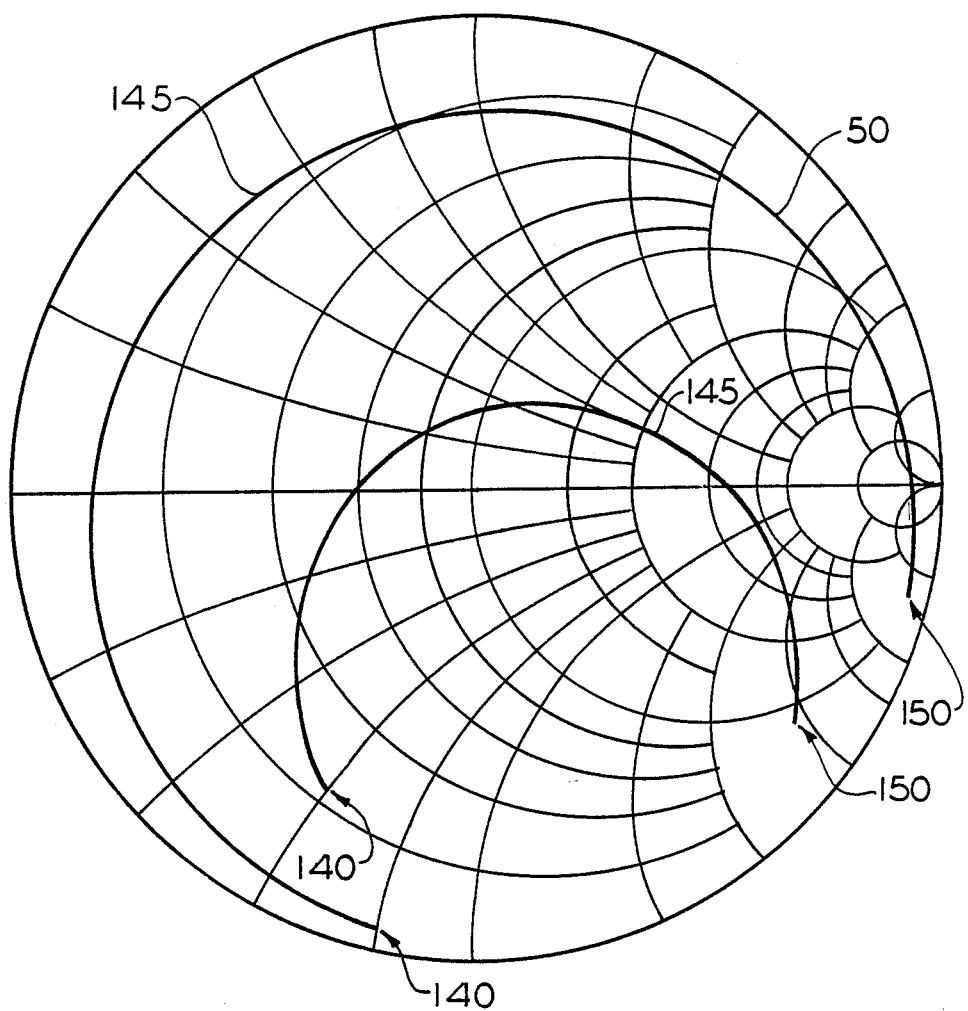
FIG. 5 is a graph illustrating the relationship between the measured input impedance and the input frequency of the circuit of FIG. 3.

In impedance coordinates, as represented in FIG. 5, the transformer input impedance locus of curve 50 is generated according to the transformer parameters identified above when $R_L$ is infinity and where the polar center for these coordinates has been normalized to 50 ohms. Curve 52 was generated when a noninductive carbon resistor having a DC resistance of 5660 ohms was connected between elements 18 and 22 of the apparatus of FIG. 2, with both of curves 50 and 52 being resolved more fully with ten (10) one (1) MHz frequency markers over the frequency sweep of 140 MHz to 150 MHz.

In the unloaded transformer case, $R_o$ alone is the major component of circuit loss and transformer operation is described by assuming that the transformation ratio is not large enough to transform $R_o$, whose value has not yet been determined, down to 50 ohms. If this were desired $C_A$ would have to be increased, in which case the spacing between elements 18 and 20 of FIG. 2 would have to be made smaller. This might be accomplished, for example, by inverting the structure defined by elements 18, 20, 22, 24, and 26 as a whole unit. As described above, however, since the transformer ratio is not large enough to transform the large value of $R_o$ down to 50 ohms, the transformer parameters are evidentially more appropriate to transforming a lower value of shunt loss to 50 ohms. Curve 52 of FIG. 5 was generated to illustrate this case by connecting the 5660 ohm resistor as described above.

It will be appreciated that the input impedance for the loaded transformer case can be represented as a near 50 ohm termination over the narrow frequency range between 143 MHz and 144 MHz. The percentage of incident power reflected from the transformer input port is very small in this frequency region and therefore a plot of the reflected power versus frequency between 143 MHz and 144 MHz can be conceptually envisioned as having a deep notch in this frequency interval. Clearly a slight increase in the load capacitance $C_L$ will displace this notch slightly lower in frequency. This may be accomplished by either slightly decreasing the actual spacing between element 22 and plate 28 or by locally decreasing the effective spacing between element 22 and plate 28 by inserting a small conducting perturbing object in the capacitor formed between element 22 and plate 28 to thereby locally displace stored energy in the electric field of $C_L$ from the volume of the conducting perturbing object.

For the case wherein the load resistance $R_L$ in equivalent circuit 60 represents an open circuit, three parameters which describe circuit 60 are the resonant frequency $f_0$, the circuit unloaded Q, $Q_0$, and the ratio of the equivalent shunt loss $R_0$ of the inductor L to the circuit unloaded Q, $R_0/Q_0$. For the case wherein the load resistance $R_L$ of circuit 60 is other than an open circuit, three parameters which describe circuit 60 are $f_0$, the loaded circuit Q ($Q_L$), and the ratio of the total equivalent shunt loss $R_0$ to the circuit loaded Q, ($R_T/Q_L$), where the total equivalent shunt loss is the combination of Ro and $R_L$ in parallel.

If a small conducting object is introduced into region 34 or the region between element 22 and plate 28 which defines the region of the load capacitance $C_L$, the conducting object slightly increases the electric field energy density by displacing the local electric field from the region of the load capacitance occupied by the conducting object. The resonant frequency at which the circuit input port has a local VSWR minimum will shift to a slightly lower resonant frequency corresponding to the local decrease in the effective spacing between element 22 and plate 28. If the region is free from any magnetic fields, the shift to the lower resonant frequency will not be accompanied by a compensating effect to a higher frequency due to a perturbation of the magnetic field. If the circuit electric field in the interior of the region of the load capacitance $C_L$ is large relative to the fringing circuit fields of the adjacent enclosure walls of housing 30 and if the electric field in the load capacitor region 34 is large relative to the electric field in the dielectric materials between the conductive surfaces of the transformer, the following relationship is applicable:

$$\frac{R_o}{Q_o} = \frac{-1 \, K_2 \, (S)^2 \, df}{\pi e_o \, K_1 \, (f_o)^2 \, dV}$$

where:

S is the distance between the conducting elements 22 and 28 defining the load capacitance $C_L$;

$e_0$ is the permeability of the free space between elements 22 and 28;

$f_o$ is the circuit resonant frequency;

df is the measured frequency shift of the resonant frequency resulting from introduction of a small conducting object into region 34;

dv is the volume of the small conducting object introduced into the capacitance region;

$K_1$ is a constant which is a function of the shape of the perturbing object and the manner with which the object is aligned relative to the local electric field surrounding the object; and $K_2$ is a constant, whose value is near unity if the gap of $C_L$ contains essentially all the circuit electric field.

If the perturbed region contains substantially all of the circuit electric field and if the perturbing object is a cylindrical member having a height which is much smaller than the distance S and the circular end of the object aligns normal to the electric field, $K_1/K_2$ approximates unity. In this approximation, because the distribution of the fields within the circuit does not depend on the circuit loss but rather on the geometry of the circuit, the measured frequency shift for both the loaded and unloaded cases is substantially the same.

The measured value of R/Q can be combined with the measured circuit Q to infer the output impedance level of the transformer 12 since the following relationship holds:

R=(R/Q) Q

For an RF transformer as illustrated in FIG. 2, three separate perturbing objects in the form of cylindrical brass buttons having a height H and a volume dv as set forth in Table 1 were introduced into the region 34 of the load capacitor. Region 34 had a uniform height of 0.093 inches, a width of 0.750 inches and a length of 2.5 inches.

TABLE 1

|  | H (inches) | dv (cubic millimeters) |
|---|---|---|
| OBJECT 1 | .031 | 68.7 |
| OBJECT 2 | .020 | 28.0 |
| OBJECT 3 | .020 | 18.8 |

The longitudinal axes of the brass objects were aligned normal to the parallel longitudinal axes of element 22 and plate 28. The observed frequency shifts and measured circuit Q for the three objects of Table 1 are set forth in Table 2 below for the case where equivalent circuit 60 is unloaded.

TABLE 2

|  | $f_o$(MHz) | df(KHz) | R/Q(ohms) | Q | $R_0$(ohms) |
|---|---|---|---|---|---|
| OBJECT 1 | 145 | −1000 | 139.0 | 299.3 | 41,602 |
| OBJECT 2 | 145 | −400 | 136.4 | 299.3 | 40,824 |
| OBJECT 3 | 145 | −260 | 132.0 | 299.3 | 39,507 |

The frequency shifts and measured loaded circuit Q for the three objects of Table 1 are set forth in Table 3 below for the case wherein equivalent circuit 60 is loaded with 5,660 ohms.

TABLE 3

|  | $f_o$(MHz) | df(KHz) | R/Q(ohms) | Q | $R_T$(ohms) |
|---|---|---|---|---|---|
| OBJECT 1 | 143.034 | −1000 | 142.7 | 45.1 | 6435 |
| OBJECT 2 | 143.034 | −380 | 133.0 | 45.1 | 5998 |
| OBJECT 3 | 143.034 | −250 | 130.3 | 45.1 | 5876 |

Figure 7:
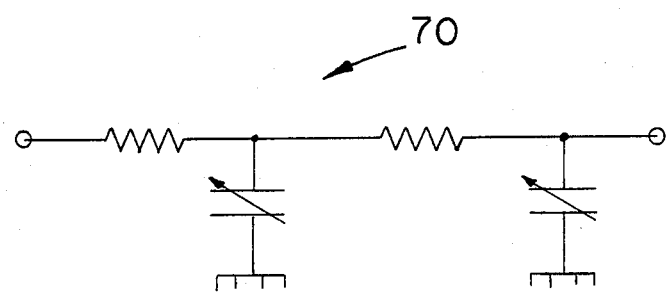
FIG. 7 is a circuit diagram for a matching circuit employed with the transformer of FIG. 6.

It should be appreciated that in the unloaded transformeer case the VSWR minimum is rather broad due to the mismatch accompanying the chosen transformer parameters and the large value of $R_o$. In such a case a non-descript matching network 70 as illustrated in FIG. 7 can be inserted between the sweep frequency RF source and the transformer to facilitate the resolution of the 260 KHz frequency shift caused by the 18.8 cubic mm perturbing object.

Several observations relative to the data of Tables 1, 2 and 3 and the dependance of R/Q on the constants $K_1$ and $K_2$ should be made. One is that the frequency shifts of like objects is substantially the same in both the loaded and unloaded cases as expected. Another is that in the high resolution data of Table 3 the frequency shift per unit volume of perturbing object is substantially the same for the two objects of the same height but noticeably less for the object of larger height thus illustrating the role of $K_1$, $K_2$ and how large H should be relative to S.

For example, in a somewhat larger enclosure with ⅛ inch thick walls with outside dimensions of 4 inches wide by 4 inches high by 6 inches deep, a transformer was constructed with a 0.250 inch high output gap with a single transformer inductor made from a 5.25 inch length of ¼ inch diameter copper tubing. At a frequency of 223.10° MHz an unloaded Q of 851.3 was achieved, and with the pertubation technique using a 12.9 cubic millimeter button an R/Q of 163.9 was measured. When this circuit was loaded with a carbon resistor having a dc resistance of 15,200 ohms, the loaded Q and R/Q were respectively 96.0 and 163.9. The dc resistor therefore had a loading effect of 15,700 ohms, very close to the expected dc value of 15,200 ohms.

The transformer action is generated when the electric field of the transformer input and output are strongly coupled. The diagnostic technique associated with perturbing the internal fields of a transformer so constructed show that a detailed picture regarding the actual output impedance level of an transformer can be obtained. The RF transformer 12 is capable, for example, of developing a peak to peak RF voltage across the gap between element 22 and 28 in excess of 1,000 volts when a 20 watt RF source is applied to the input port across elements 18 and 20.

Figure 6:
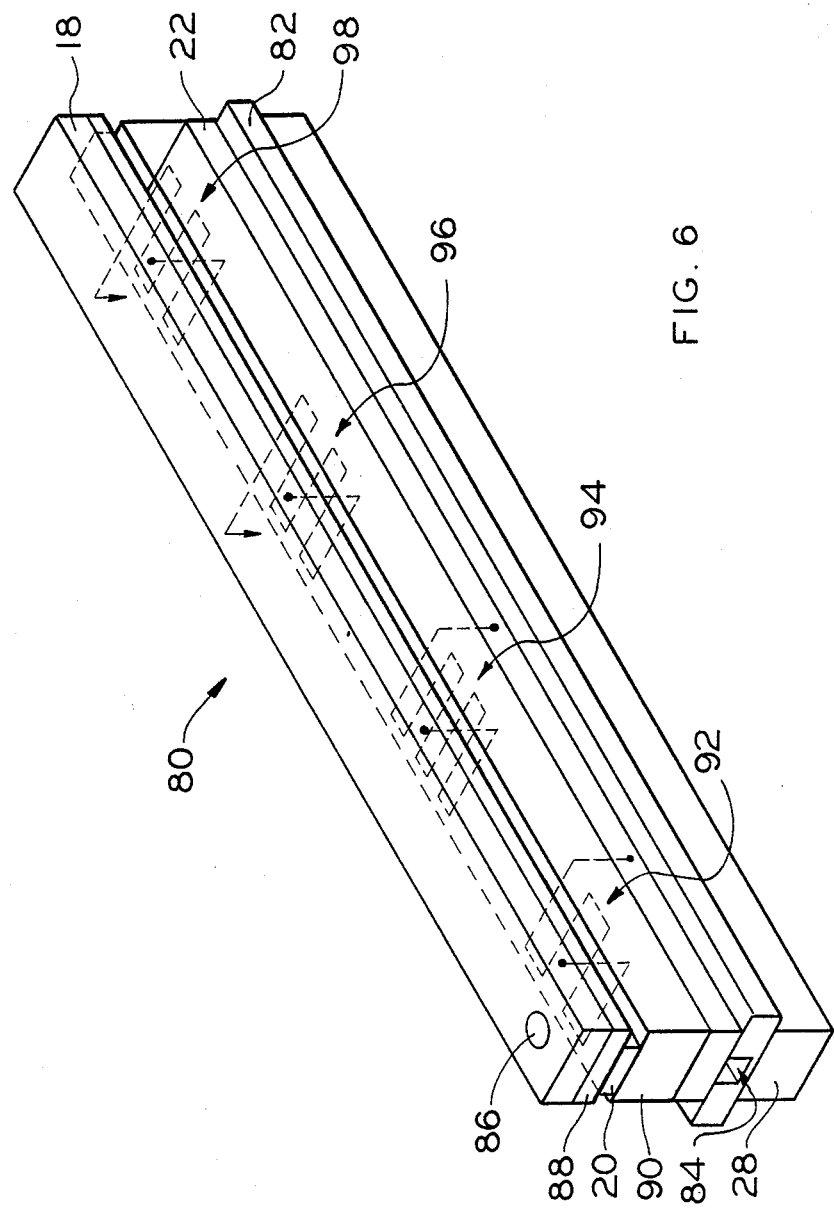
FIG. 6 is a schematic fragmentary perspective view of a third embodiment of an RF transformer in accordance with the present invention, the transformer of FIG. 6 being adapted for developing a confined gas discharge therein.

In accordance with the invention, an electrically elongated RF transformer adapted to illustrate a useful geometry for a high power laser is generally designated in FIG. 6 by the numeral 80. A strip 82 of "Teflon" material is interposed between elements 22 and 28. Strip 82, in one reduction to practice, is was 0.200 inches high by 0.900 inches wide by 21.625 inches long. A rectangular slot 84 is symmetrically machined along the longitudinal center line of strip 82. Slot 84 was 0.310 inches wide by 0.140 inches deep. A third strip 90 of "Teflon" material having a thickness of 0.750 inches maintains elements 20 and 22 in parallel spaced relationship. Inductors 92, 94, 96 and 98 are electrically connected between conductive elements 18 and 22. The foregoing inductors were constructed from a 0.050 inch diameter copper wire. The length l of each of the inductive wires in inches and the mean axial location Z from the end feed point in centimeters is set forth in Table 4 below.

TABLE 4

|  | l (inches) | z (centimeters) |
|---|---|---|
| INDUCTOR 92 | 5.9 | 10 |
| INDUCTOR 94 | 8.4 | 11.5 |
| INDUCTOR 96 | 7.4 | 34 |
| INDUCTOR 98 | 7.9 | 48 |

With further reference to FIG. 6, it should be appreciated that the points of connection, the number of turns and the manner of connection, i.e., the orientation of the grounded end relative to the input port, may be varied for the inductors for each transformer configuration. In the disclosed embodiment the coordinates at which each of the inductors is connected to the element 18 is less than the corresponding coordinate at which each inductor is connected to with element 22, i.e., there is a vertical offset of the connection points. It should be appreciated that the foregoing relationship may be reversed or alternated as desired to provide a predetermined voltage distribution corresponding to a pre-established inductance distribution. In practice, the drive frequency will be selected and the inductors fabricated. The inductors will then be connected with the initial connection points based upon prior experience. Next, the inductors will be varied to achieve the desired frequency, i.e., a network analyzer will be employed to see if the VSWR minimum is at the selected frequency and, if not, the inductors will be physically varied. Thereafter, the measuring technique of the present invention will be used to determine if the frequency shift along slot 84, i.e., $C_L$, is the same at all points. If the frequency shift is not substantially constant, the inductors will be altered and/or the points of connection of the inductors will be changed. The procedure is done repetitively until the desired results are achieved.

The internal fields of the transformer of FIG. 6 may be accessed by attaching a perturbing object (not illustrated) to a thin ten (10) lb. test monofilament fishing line and pulling the perturbing object through strip 82 along slot 84. For these measurements a cylindrical perturbing object of a height 0.032 inches and volume 39.0 cubic millimeters was used.

For one case, wherein strip 82 was removed to provide an air gap of 0.125 inches, a sharp VSWR minimum occurred at 138.900 MHz and an average frequency shift of 59 KHz was measured at several locations Z along the transformer structure yielding a $R_0/Q_0$ value of 28.4. With the slotted strip 82 in place as illustrated in FIG. 6, the VSWR minimum occurred at 148.600 MHz and an unloaded circuit $Q_0$ of 317.5 was measured. As the button traversed the axial slot 84, the average $R_0$ was determined to be approximately 9,200 ohms with an estimated uncertainty of plus or minus 15 percent.

Figure 8:
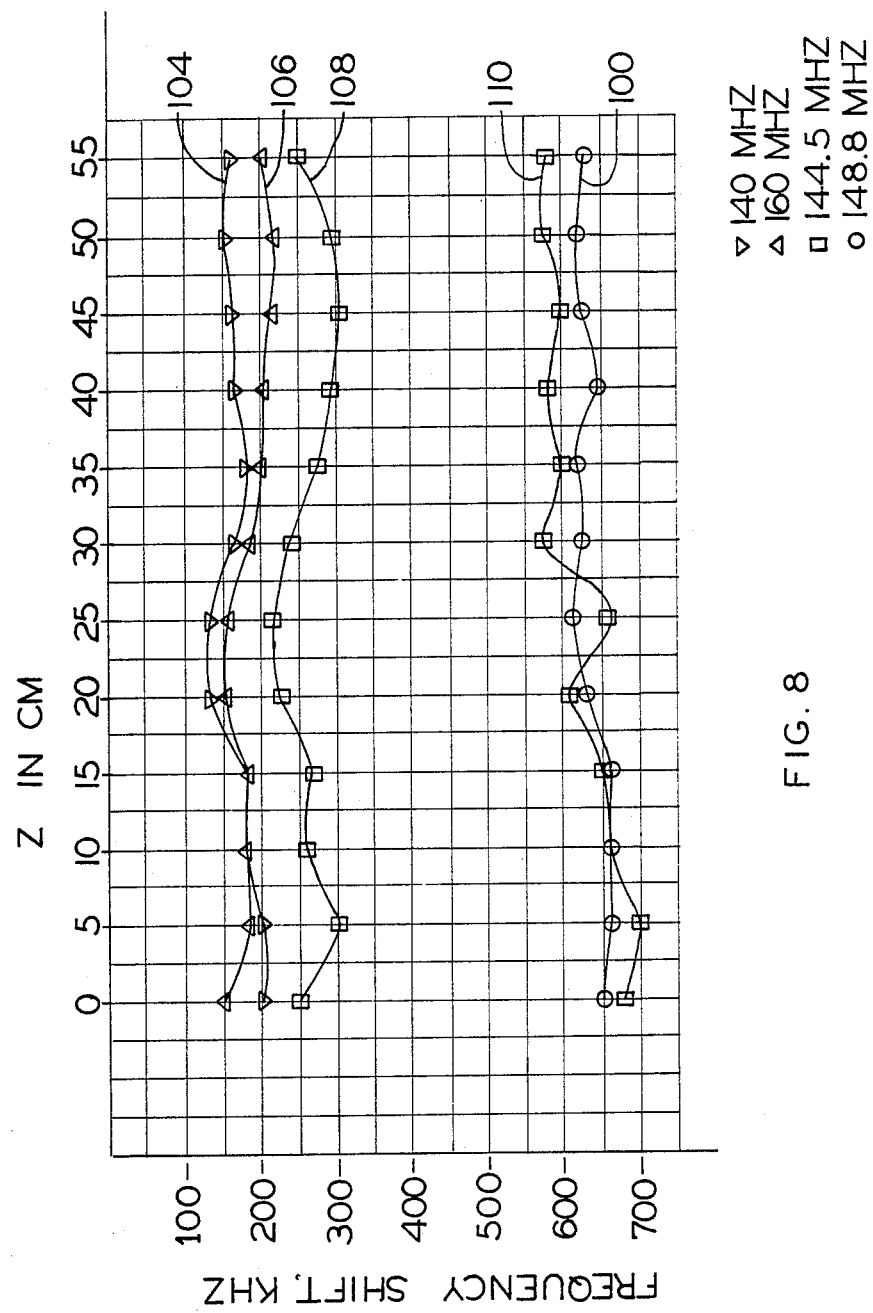
FIG. 8 is a graph illustrating the relative field distribution for the transformer of FIG. 6.

With reference to FIG. 8, a graphical representation of the negative frequency shift in KHz versus the distance along the axis Z in centimeters is illustrated. Curve 100 represents the frequency shift measurements at 5 centimeter intervals along the slot 84 for the perturbing button having a height of 0.032 inches and volume of 39.0 cubic millimeters. A VSWR minimum of 148.8 MHz was obtained. Curves 104, 106 and 108 illustrate the field uniformity for a larger rectangular perturbing object at a number of various frequencies. The use of a high power, 7 watt RF source whose frequency was turned to 144.5 MHz is specifically emphasized since VSWR minimums of 140, 160, and 144.5 MHz were obtained for curves 104, 106 and 108, respectively, using an external matching circuit such as circuit 70 to enhance the resolution of the VSWR minimum at the arbitrarily chosen frequencies in the region of interest.

Curve 110 of FIG. 8, illustrates the frequency shift versus the distance of the perturbing object along slot 84 for a case wherein transformer 80 is modified by reversing the coordinates of the points of connection of the inductors to elements 18 and 22.

Figure 9:
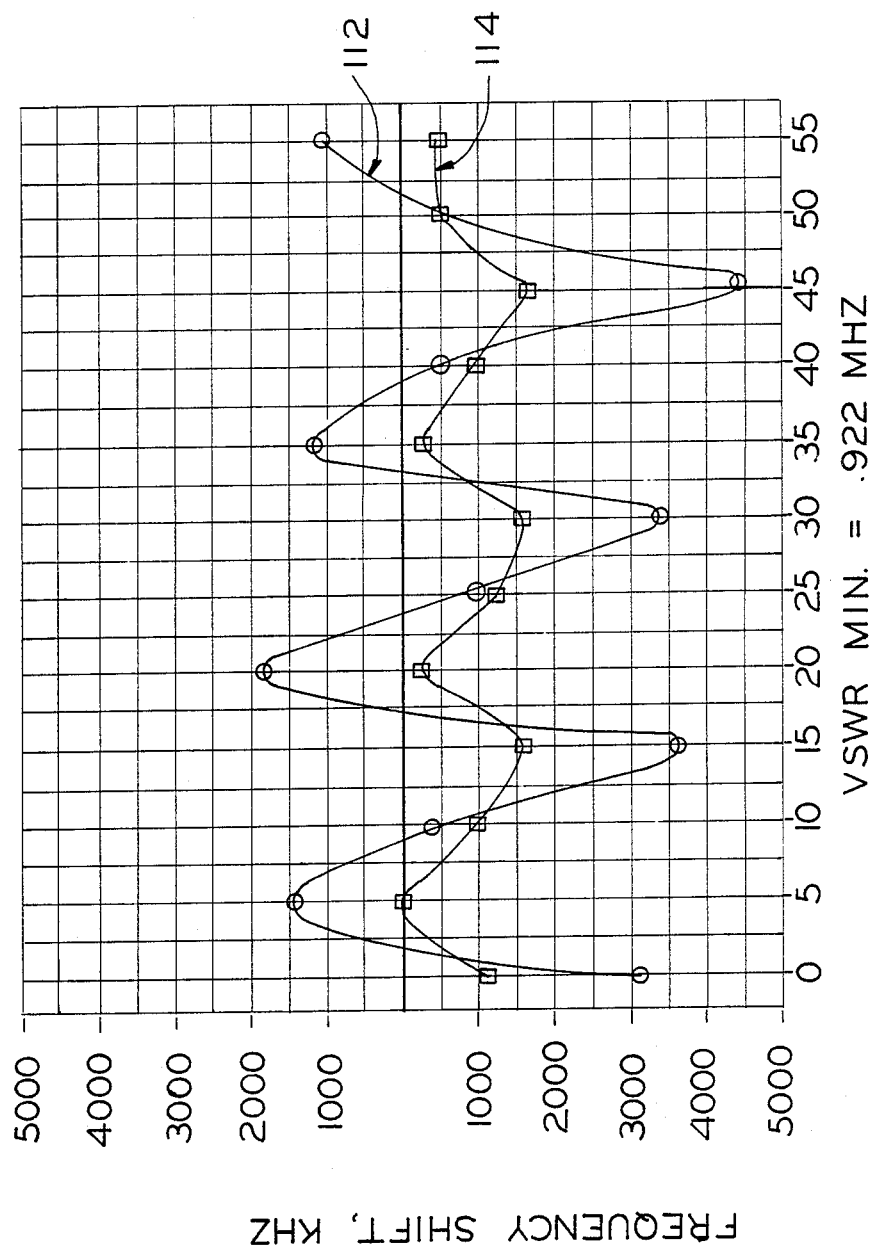
FIG. 9 is a graph illustrating another field distribution for the transformer of FIG. 6.

With regard to FIG. 9, curve 112 is a plot of frequency shift versus the distance along slot 84 for a natrually occurring VSWR minimum at 922 MHz for a metal perturbing object. Curve 114 is a similar plot for a ceramic perturbing object. The foregoing data illustrates that the positive frequency shifts are to the magnetic fields since the insulator of curve 114 perturbs only stored energy in the electric field.

The data of FIG. 9 was taken without using an impedance matching circuit between the RF source and the RF transformer. The data represented curves 104, 106 and 108 of FIG. 8 was obtained using a circuit such as that of FIG. 7. The FIG. 9 data illustrates that if a transversely excited gas discharge circuit has a naturally occuring VSWR minimum at a frequency of interest then detailed internal field information is obtained by measuring the shift in the VSW minimum associated with introducing a perturbing object into the capacitive space where the discharge is desired. The curve 106 of FIG. 8 indicates that even if the probing frequency of 160 MHz is not coincident with the frequency of the naturally occuring VSWR minimum at 148.8 MHz, the shift in VSWR minimum caused by the perturbing object can be resolved if an external matching circuit is used. When an external circuit is used even for a high, i.e., Q $Q_0$=317.5, discharge circuit far removed from its naturally occuring VSWR minimum, the measured spatial variation of frequency is preserved although the observed frequency shift is diminished. Thus when only relative field information is desired an external circuit can be used to generate a notch sufficiently deep to resolve the frequency shift of small perturbing objects as long as the induced frequency shift due to the small object is small relative to the bandwidth of the external circuit.

The clear utility of the pertubation technique is that there are several related methods which can be used to extract relative information regarding the internal fields of a laser without physically or mechanically altering the structure. From an electrical standpoint it can be appreciated that no secondary effects or secondary corrections due to the introduction of either a voltage or current probe need to be taken into account.

The data of curve 108 of FIG. 8 indicates that even a higher power RF source, such as the discharge excitation source itself, can be employed for this purpose. When the technique is employed in detail, absolute information regarding the actual output impedance level of various transformer circuits is obtainable up to output levels of several thousand ohms.

In accordance with the present invention, the elongated transformer of FIG. 6 enclosed in the housing of FIG. 2 had the following characteristics when adapted as a $CO_2$ laser. Element 28 was of aluminum 0.625 inches wide by 0.500 inches high by 36.7 cm long; element 82 was made from two identical alumina strips 0.950 inches wide by 0.196 inches high by 38 cm long, each of which had a semicircular groove (84) of 0.250 inches in width ground along the longitudinal centerline thereof so that a cylindrical gas discharge volume was defined; element 22 was of aluminum 0.625 inches wide by 0.250 inches high by 36.7 cm long; element 90 was of alumina 0.625 inches wide by 0.525 inches high by 38 cm long, with 28 each 0.094 inch holes therein to allow passage of the wire for the transformer inductances; element 20 was a 0.020 inch thick brass sheet 0.400 inches wide by 36 cm long; element 88 electrically was a "Teflon" spacer 0.400 inches wide by 0.225 inches high by 36 cm long with a 0.225 inch high by 0.625 inch wide by 38 cm long alumina "window frame" holder; and element 18 was a aluminum piece 0.625 inches wide by 0.245 inches high by 38 cm long. The elongated housing of FIG. 2 was 41.6 cm in overall length and for operation near 146 MHz, the inductors were as described in Table 5.

TABLE 5

|  | l (inches) | z (centimeters) | wire diameter |
|---|---|---|---|
| INDUCTOR 92 | 5.9 | 3.0 | .032 |
| INDUCTOR 94 | 7.8 | 10.0 | .032 |
| INDUCTOR 96 | 5.5 | 16.5 | .032 |
| INDUCTOR 98 | 5.5 | 26.0 | .032 |
| INDUCTOR 100 | 4.6 | 32.0 | .048 |

Operating as a $CO_2$ laser, the 37 cm long by 6.35 mm diameter gain medium was generated by pumping a 1-1-6:$CO_2$-Air-He gas mix at a pressure of approximately 25 Torr with 170 watts of RF at a frequency of 146.520 MHz. The optical cavity formed by a plano 95% reflecting ZnSe output coupler and a plano maxiumum reflectivity compressed silicon mirror generated a multimode output pattern characteristic of an optical resonator with a Fresnel number of 1.9.

While preferred embodiments of the foregoing invention have been set forth for purposes of illustration, the foregoing description should not be deemed a limitation of the invention herein. Accordingly, various modifications, alternatives and adaptations may be made by one skilled in the art without departing from the spirit and scope of the present invention.

What is claimed is:

1. An RF excited gas laser including a first grounded conducting surface and a third ungrounded conducting surface, said first and third conducting surfaces defining an interior capacitance $C_x$ therebetween with said third ungrounded conducting surface having a capacitance $C_L$ measured to ground and exterior to the capacitance $C_x$, said laser further including a second ungrounded conducting surface disposed between said first and third conducting surfaces whereby said interior capacitance $C_x$ is divided into series capacitances $C_A$ and $C_B$, at least first inductor means connected between two of said conducting surfaces, means for applying an RF frequency drive voltage between said second and said first conducting surfaces whereby power is supplied to the laser, means coupled to said applying means for generating an RF frequency drive voltage, reflected power at said applying means being minimized at the frequency of said drive voltage, and means defining a gas discharge chamber in a dielectric region of said capacitance $C_L$, said gas discharge chamber defining means having an optionally resonant cavity, and a pressurized gas being confined in said chamber.

2. The RF excited gas laser of claim 1 wherein said inductor means is electrically connected between said second and third conducting surfaces.

3. The RF excited gas laser of claim 1 wherein said inductor means is electrically connected between said first and second conducting surfaces.

4. The RF excited gas laser of claim 1 wherein said inductor means is electrically connected between said third conducting surface and ground.

5. The RF excited gas laser of claim 1 wherein said gas discharge chamber defining means comprises a wave guide laser.

6. The RF excited gas laser of claim 1 further comprising a fourth grounded conducting surface, said fourth conducting surface being spaced from said third conducting surface and being positioned on the side of said third conducting surface which is opposite to said second conducting surface, said capacitance $C_L$ being measured between said third and fourth conducting surfaces.

7. The RF excited gas laser of claim 6 wherein said inductor means is electrically connected between said third and fourth conducting surfaces.

8. The RF excited gas laser comprising:
   first conductive plate means, said first plate means being electrically grounded;
   second conductive plate means, said second plate means being spaced from said first plate means and being electrically grounded;
   third conductive plate means, said third plate means being disposed intermediate said first and second plate means, a capacitor having a capacitance $C_A$ being defined by said first and third plate means and a dielectric medium therebetween;
   fourth conductive plate means, said fourth plate means being disposed between said second and third plate means, a capacitor having a capacitance $C_B$ being defined by said third and fourth plate means and a dielectric medium therebetween whereby a capacitance $C_X$ comprising capacitances $C_A$ and $C_B$ is established between said first and fourth plate means, a capacitor having a capacitance $C_L$ being defined by said second and fourth plate means;
   means defining a gas discharge chamber disposed between said second and fourth plate means, said gas discharge chamber defining means including an optically resonant cavity;
   means for defining a circuit inductance, said inductance defining means being connected between one of said third or fourth plate means and a further one of said plate means;
   means for applying a drive voltage to one of said third or fourth plate means whereby power may be delivered to the laser to excite the gas in said cavity; and
   means for generating an RF frequency drive voltage and coupling said drive voltage to said applying means, said drive voltage generating means providing a drive voltage at a frequency which is commensurate with substantially minimum of the electrical power delivered to said applying means being reflected therefrom.

9. The RF excited gas laser of claim 8 wherein said inductance defining means comprises an inductor electrically connected between said third plate means and one of said grounded plate means.

10. The RF excited gas laser of claim 8 wherein said inductance defining means comprises an inductor electrically connected between said fourth plate means and one of said grounded plate means.

11. The RF excited gas laser of claim 8 wherein said inductance defining means comprises an inductor electrically connected between said third and fourth plate means.

12. The RF excited gas laser of claim 8 wherein said third and fourth plate means are spaced apart by a distance which is constant along the entire length of the plate means and the space between said third and fourth plate means is occupied by a low loss solid dielectric material.

13. The RF excited gas laser of claim 12 wherein the inductance defining means is positioned to isolate the said cavity from magnetic fields produced by the flow of current in said inductance defining means.

14. The RF excited gas laser of claim 13 wherein said inductance defining means comprises an inductor electrically connected between said first and third plate means.

15. The RF excited gas laser of claim 13 wherein said inductance defining means comprises an inductor electrically connected between said first and fourth plate means.

* * * * *